US008432669B2

(12) United States Patent
Peng et al.

(10) Patent No.: US 8,432,669 B2
(45) Date of Patent: Apr. 30, 2013

(54) SIGNAL RECEIVING APPARATUS AND ELECTRONIC DEVICE USING THE SAME

(75) Inventors: Ke-Hui Peng, Shenzhen (CN); Yong-Min Li, Shenzhen (CN); Li-Ni Liang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 200 days.

(21) Appl. No.: 13/150,285

(22) Filed: Jun. 1, 2011

(65) Prior Publication Data

US 2012/0044619 A1 Feb. 23, 2012

(30) Foreign Application Priority Data

Aug. 23, 2010 (CN) .......................... 2010 1 0259726

(51) Int. Cl.
*G06F 1/16* (2006.01)

(52) U.S. Cl.
USPC ................ 361/679.01; 455/226.2; 340/572.8; 375/277; 348/607

(58) Field of Classification Search ............... 455/456.1, 455/406, 411, 209, 452.2, 450, 67.11, 179.1, 455/226.2; 340/572.8, 932, 3.1, 7.57; 343/876, 343/749, 795, 860, 702; 375/340, 295, 345, 375/342, 343, 350, 277; 348/730, 731, 726, 348/192, 734, 607; 361/679.01, 679.31, 361/679.43, 679.41, 679.26, 679.4, 679.57, 361/679.29, 679.27, 679.3, 761, 800, 832; 345/204, 158, 156, 157, 169
See application file for complete search history.

(56) References Cited

U.S. PATENT DOCUMENTS

| | | | | |
|---|---|---|---|---|
| 8,089,362 | B2 * | 1/2012 | Chamandy et al. | 340/572.8 |
| 2006/0211405 | A1 * | 9/2006 | Scalisi et al. | 455/406 |
| 2012/0258728 | A1 * | 10/2012 | Seal et al. | 455/456.1 |

* cited by examiner

*Primary Examiner* — Hung Duong
(74) *Attorney, Agent, or Firm* — Altis Law Group, Inc.

(57) ABSTRACT

A signal receiving apparatus includes a main body for receiving control signals, and a cover covering the main body. The cover includes a receiving portion and at least one fixing portion. The receiving portion receives the main body, and the at least one fixing portion fixes the signal receiving apparatus to a housing of an electronic device. An electronic device using the signal receiving apparatus is also provided.

14 Claims, 5 Drawing Sheets

SIGNAL RECEIVING APPARATUS AND ELECTRONIC DEVICE USING THE SAME

BACKGROUND

1. Technical Field

The present disclosure relates to electronic devices; and particularly to an electronic device having a signal receiving apparatus.

2. Description of Related Art

Remote controls are commonly used in daily life for controlling electronic devices, such as televisions. Each television usually includes a signal receiving apparatus for receiving remote control signals transmitted by the corresponding remote control. The receiving apparatus often includes a main body for receiving the remote control signals, and a transparent cover covering the main body for protection. However, the size of the cover is often small, and attached to the housing of the television. Thus, the cover is easily disengaged from the housing of the television and the main body may be vulnerable to static electricity.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the five views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
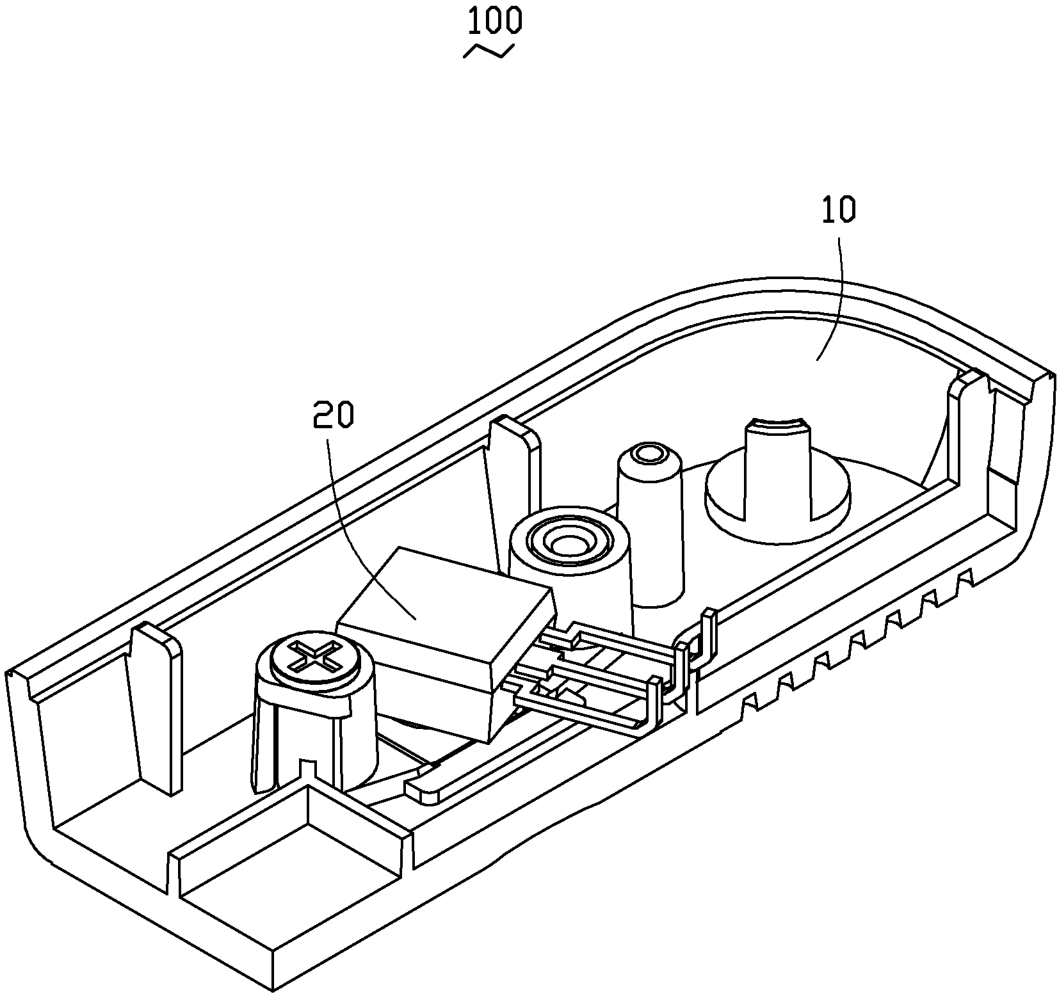
FIG. 1 is a partial perspective view of an electronic device in accordance with an exemplary embodiment; the electronic device includes a cover.
Figure 2:
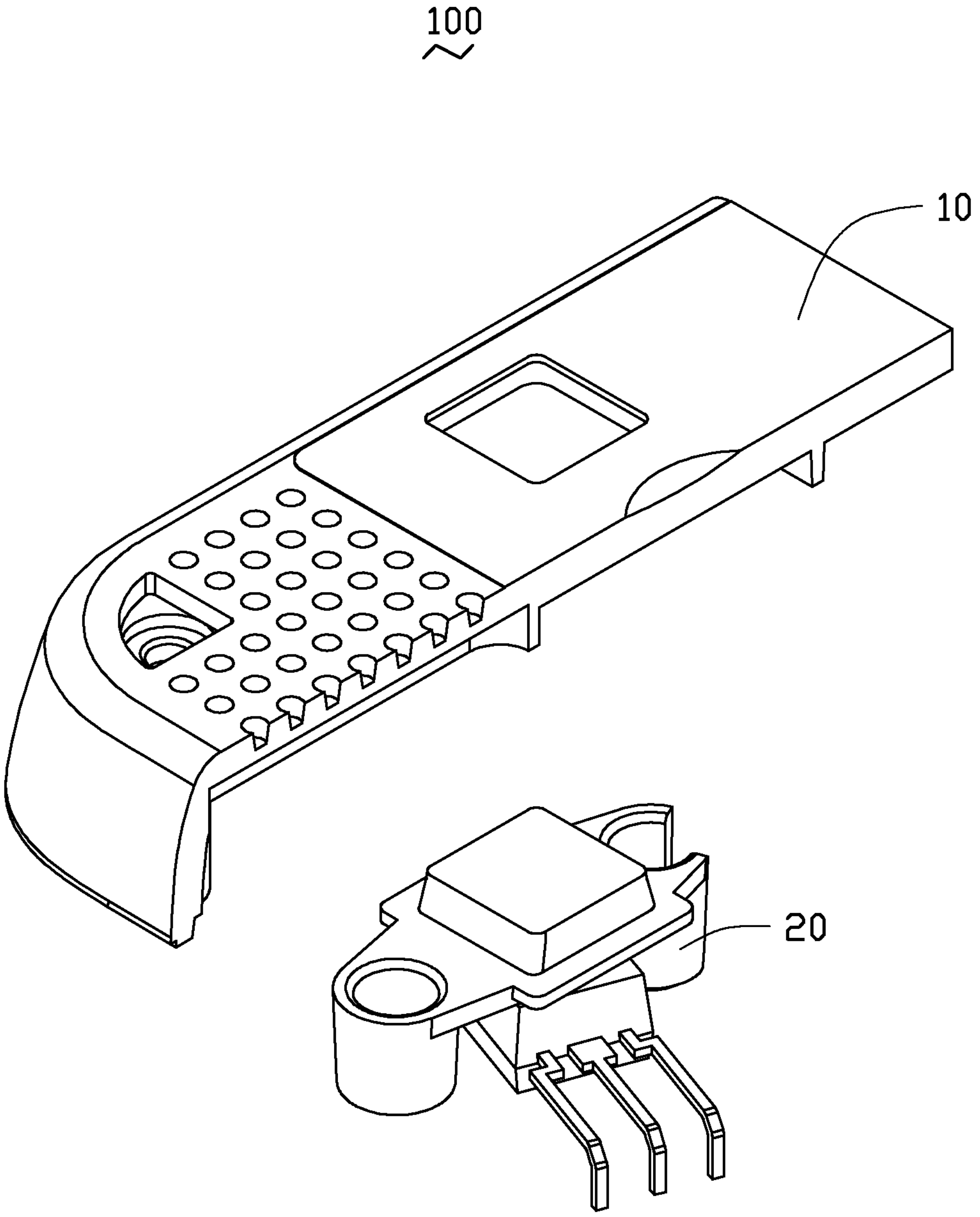
FIG. 2 is a partially disassembled perspective view of the electronic device of FIG. 1.

Referring to FIGS. 1 and 2, an electronic device 100 in accordance with an embodiment is shown. The electronic device 100 is capable of being remotely controlled by remote controls (not shown). In detail, the remote controls generate control signals in response to operations of the user and transmit the control signals to the electronic device 100, and the electronic device 100 receives and responds to the control signals, whereby the electronic device 100 is remotely controlled by the remote controls. In the embodiment, the control signals are transmitted via infrared light. The electronic device 100 includes a housing 10 and a signal receiving apparatus 20 mounted to the housing 10.

Figure 3:
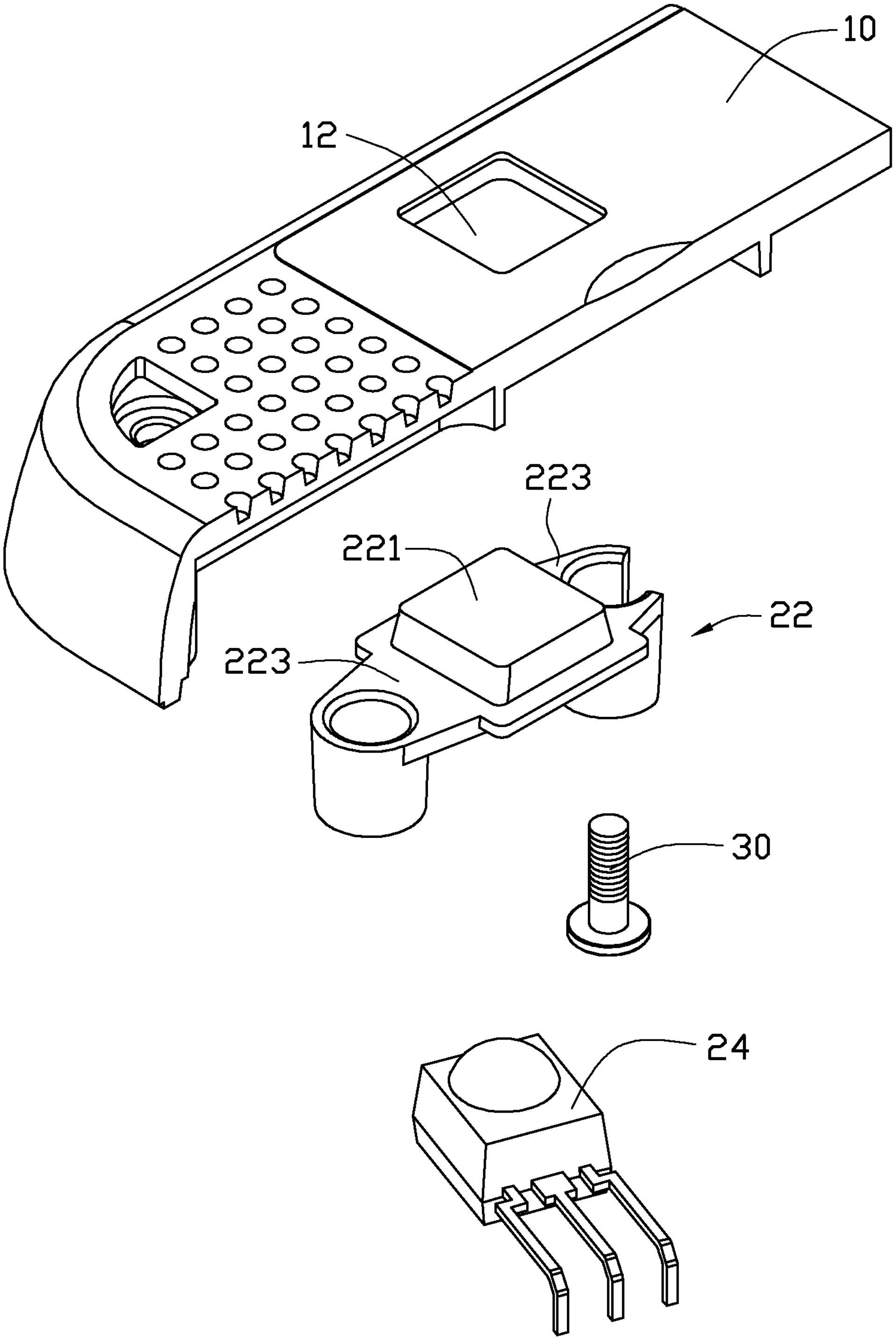
FIG. 3 is a disassembled perspective view of the electronic device of FIG. 1.
Figure 4:
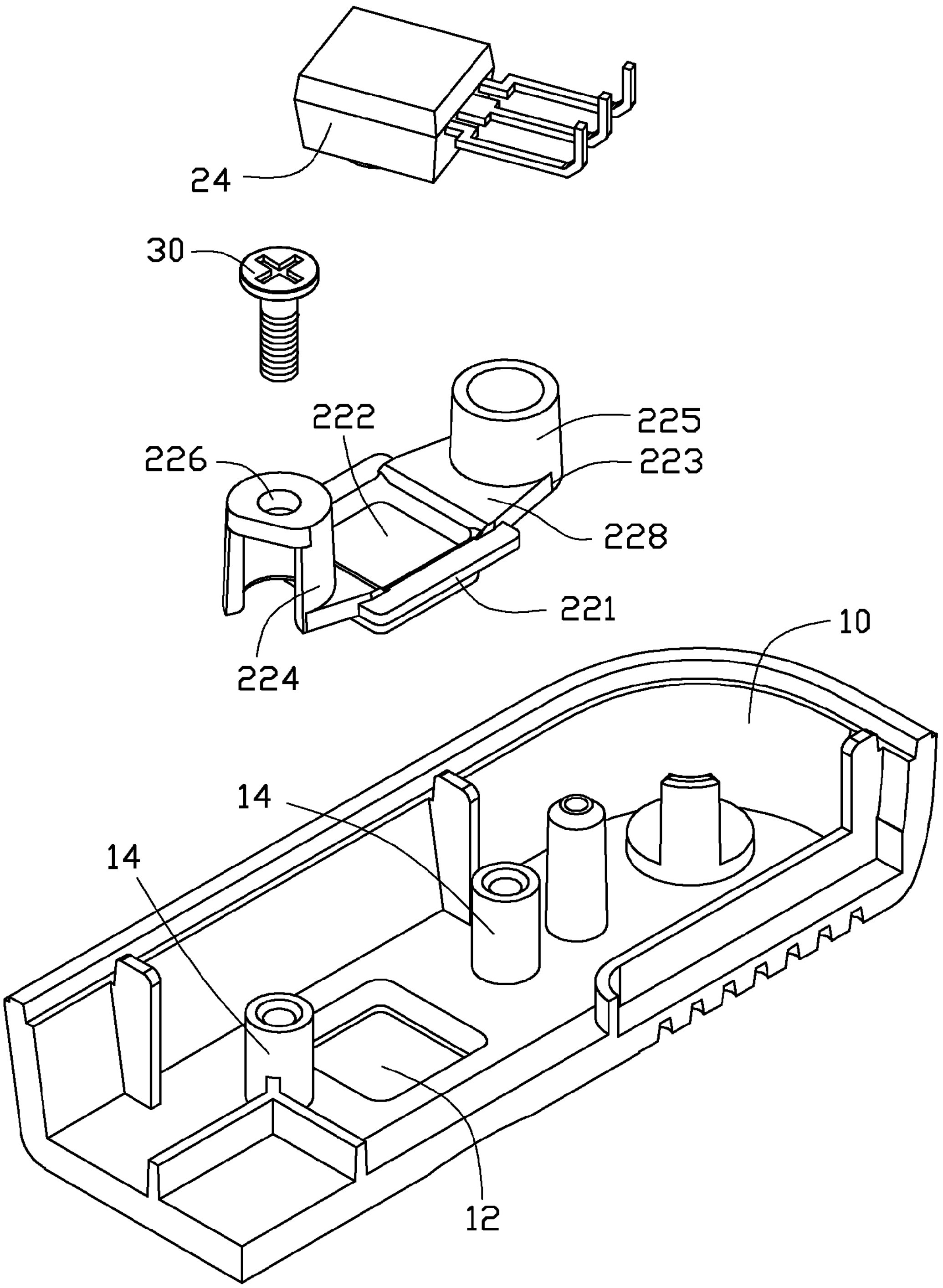
FIG. 4 is similar to FIG. 3, but viewed from another aspect.

Referring further to FIGS. 3-4, the housing 10 defines an opening 12. The opening 12 is substantially rectangular. A portion of the signal receiving apparatus 20 is exposed out of the housing 10 via the opening 12. Two protrusions 14 protrude from an inner surface of the housing 10. The protrusions 14 are arranged symmetrically and respectively at opposite sides of the opening 14. The protrusions 14 are hollow and are used to retain the signal receiving apparatus 20.

The signal receiving apparatus 20 includes a cover 22 and a main body 24. The cover 22 covers the main body 24. The cover 22 is transparent and secured to the housing 10. In the embodiment, the cover 22 is an infrared lens. The cover 22 is exposed from the housing 10 via the opening 12. The main body 24 is accommodated in the housing 10 and receives control signals from a remote control or remote controls through the cover 22, such that the electronic device 100 is remotely controlled by the remote control or remote controls.

Figure 5:
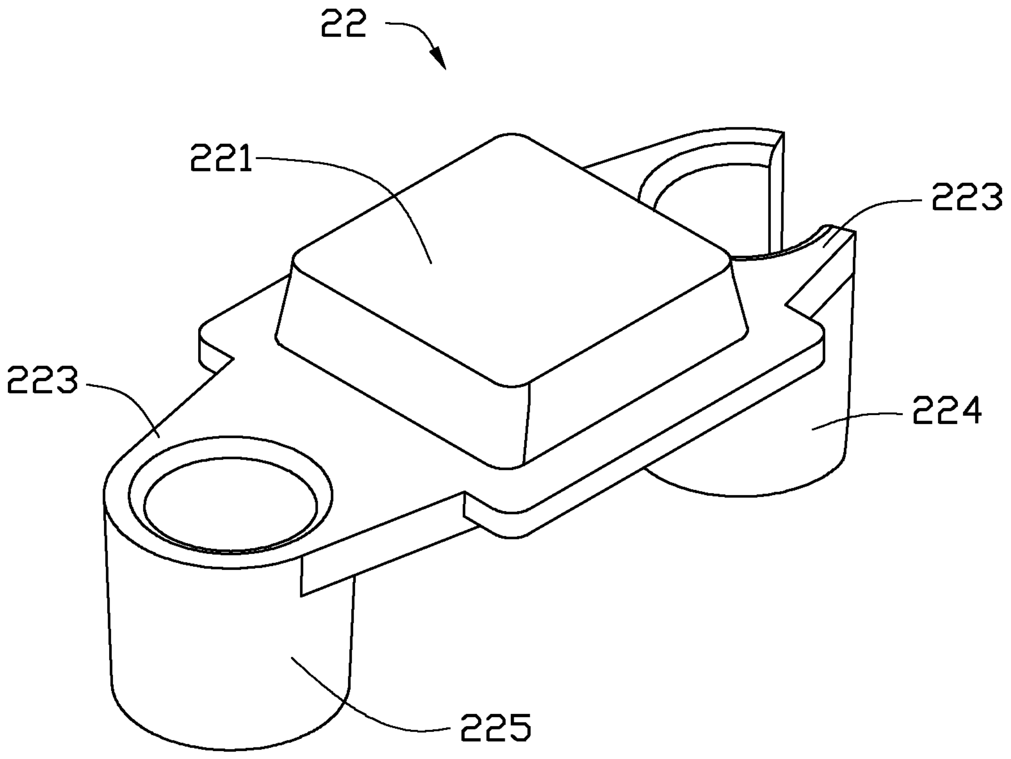
FIG. 5 is an enlarged view of the cover of the electronic device in FIG. 4.

Referring to FIG. 5, the cover 22 includes a receiving portion 221 and two fixing portions 223. The fixing portions 223 are arranged at two opposite sides of the receiving portion 221 respectively. The receiving portion 221 defines a recessed receiving space 222 (shown in FIG. 4). The receiving space 222 receives the main body 24. A first post 224 and a second post 225 protrude perpendicularly from the fixing portions 223 respectively. The first post 224 and the second post 225 extend in a direction reverse to a recessed direction of the receiving space 222. The first post 224 and the second post 225 are hollow and correspond to the protrusions 14. The first post 224 and the second post 225 engage with corresponding protrusions 14 respectively, such that the cover 22 is mounted to the housing 10. Referring also to FIG. 4, in the embodiment, the first and second post 224, 225 are similar, the difference is that an end of the first post 224 defines a fixing hole 226 and a portion of the first post 224 is cut out. Bolts 30 extend through the fixing hole 226 and thread into the corresponding protrusion 14, whereby the cover 22 is secured to the housing 10. The cover 22 can be mounted to the housing 10 using other methods, such as, soldering.

Referring to FIG. 4 again, the signal receiving apparatus 20 further includes a stopping member 228. The stopping member 228 is fixed to the fixing portion 223. The stopping member 228 and the first and second post 224, 225 are arranged on the same side of the cover 22. When the main body 24 is received in the receiving space 222, the stopping member 228 is used to resist against the main body 24 to keep the main body 24 from directly contacting the bottom portion of the receiving space 222. As a result, a clearance is defined between the bottom portion of the receiving space 222 and the main body 24 to protect the signal receiving apparatus 20 from static electricity.

The main body 24 is received in the receiving portion 222 and is securely fixed to the housing 10 by way of the fixing portions 223, whereby, the signal receiving apparatus 20 can be securely fixed to the electronic device 100. Furthermore, the signal receiving apparatus 20 is protected from static electricity because of the way the stopping member 228 is arranged on the fixing portions 223.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A signal receiving apparatus, comprising:

a main body for receiving control signals; and a cover covering the main body, wherein the cover comprises a receiving portion and at least one fixing portion, the receiving portion is configured for receiving the main body, and the at least one fixing portion is configured for fixing the signal receiving apparatus to a housing of an electronic device.

2. The signal receiving apparatus of claim 1, wherein the receiving portion defines a receiving space, and the receiving space is used for receiving the main body.

3. The signal receiving apparatus of claim 2, wherein the cover comprises two fixing portions and the fixing portions are arranged at two opposite sides of the receiving space.

4. The signal receiving apparatus of claim 3, wherein a post protrudes from each fixing portion, the post extends in a direction reverse to a recessed direction of the receiving portion and is for securing the cover to the housing of the electronic device.

5. The signal receiving apparatus of claim 3, wherein a clearance is defined between the bottom portion of the receiving space and the main body.

6. The signal receiving apparatus of claim 5, wherein the cover further comprises a stopping member, the stopping member and the posts are arranged on the same side of the cover, and the stopping member is used to resist against the main body to avoid the main body contacting the bottom portion of the receiving space directly.

7. An electronic device, comprising:

a housing defining an opening; and a signal receiving apparatus receiving in the housing, wherein the signal receiving apparatus comprises a main body for receiving control signals and a cover covering the main body, the cover is exposed out of the housing from the opening and comprises a receiving portion and at least one fixing portion, the receiving portion is configured for receiving the main body, and the at least one fixing portion is configured for securing the signal receiving apparatus to the housing.

8. The electronic device of claim 7, wherein the receiving portion defines a receiving space, the receiving space is used for receiving the main body.

9. The electronic device of claim 8, wherein the cover comprises two fixing portions, the fixing portions are arranged at two opposite sides of the receiving space respectively.

10. The electronic device of claim 9, wherein a post protrudes from each fixing portion, the post extends in a direction reverse to a recessed direction of the receiving portion and is for securing the cover to the housing.

11. The electronic device of claim 9, wherein a clearance is defined between the bottom portion of the receiving space and the main body.

12. The electronic device of claim 11, wherein the cover further comprises a stopping member, the stopping member and the posts are arranged on the same side of the cover, and the stopping member is used to resist against the main body to avoid the main body contacting the bottom portion of the receiving space directly.

13. The electronic device of claim 7, wherein the cover is exposed out of the housing via the opening.

14. The electronic device of claim 13, wherein two protrusions protrude from the housing, the protrusions are arranged at two opposite sides of the opening respectively and are used for securing the cover.

* * * * *